United States Patent [19]

Asami et al.

[11] Patent Number: 4,601,919
[45] Date of Patent: Jul. 22, 1986

[54] METHOD FOR PREPARING POSITIVE ELECTRODE FOR NON-AQUEOUS ELECTROLYTE CELL

[75] Inventors: Yoshiaki Asami, Tokyo; Shintaro Suzuki, Ebina; Hirotsugu Fujita, Yono; Fumiko Homma, Tokyo, all of Japan

[73] Assignee: Toshiba Battery Co., Ltd., Tokyo, Japan

[21] Appl. No.: 692,188

[22] Filed: Jan. 17, 1985

[30] Foreign Application Priority Data

Jan. 18, 1984 [JP] Japan .................................. 59-6933

[51] Int. Cl.$^4$ .......................... B05D 5/12; H01M 4/04
[52] U.S. Cl. .................. 427/126.3; 429/217; 429/224
[58] Field of Search .................. 429/217, 224; 427/126.3

[56] References Cited

U.S. PATENT DOCUMENTS 2,747,009  5/1956  Kirkwood .......................... 429/205
4,327,166  4/1982  Leger .................................. 429/224

Primary Examiner—Richard Bueker
Attorney, Agent, or Firm—Schwartz, Jeffery, Schwaab, Mack, Blumenthal & Evans

[57] ABSTRACT

A method for preparing a positive electrode for a non-aqueous electrolyte cell comprises applying a positive electrode-active material, an electrically conductive agent, a dispersion of polytetrafluoroethylene and a mixture of polyacrylic acid and water on one side or both sides of a supporting material, and then drying the coated supporting material at about 250° C. for 5 to 10 hours.

9 Claims, 4 Drawing Figures

METHOD FOR PREPARING POSITIVE ELECTRODE FOR NON-AQUEOUS ELECTROLYTE CELL

BACKGROUND OF THE INVENTION

This invention relates to a method for preparing a positive electrode for a non-aqueous electrolyte cell.

Heretofore, the positive electrode for the non-aqueous electrolyte cell has been prepared by first adding a dispersion of polytetrafluoroethylene as a binder to a mixture of a positive electrode-active material and an electrically conductive agent, kneading these components, applying them on a supporting material, and drying it.

However, the use of dispersion of polytetrafluoroethylene as the binder will cause to become a fibrous state at the process where kneading is carried out to obtain a paste mixture, and at this time, masses of the fibrous material are partially produced in the paste mixture. If the paste mixture containing such masses is applied on the corematerial, it will be impossible to obtain the positive electrode in which the active material is homogeneously distributed and the thickness is uniform.

If such an ununiformed positive electrode is used to prepare the cell, the scatter of a discharge capacity will be wide and the prepared cell will thus be poor in quality. For the purpose of overcoming such a drawback, it has been suggested that a semisynthetic water-soluble high polymer such as methyl cellulose or carboxymethyl cellulose is added to the above-mentioned paste, whereby the positive electrode having a uniform thickness can be obtained. However, the positive electrode plate for the non-aqueous electrolyte cell is to be dried at a temperature of about 250° C. before the manufacture of the cell. Therefore, if employed as the positive electrode-active material, the manganese dioxide will react with methyl cellulose or carboxymethyl cellulose, so that the oxidation number of the manganese dioxide will be lowered. When the positive electrode plate which contains the manganese dioxide having such a less oxidation number is used to prepare the non-aqueous electrolyte cell, the discharge capacity of the prepared cell decreases.

SUMMARY OF THE INVENTION

In order to eliminate the above drawbacks, the present inventors have made extensive studies for preparing a positive electrode for non-aqueous electrolyte cell and have accomplished the present invention.

Namely, an object of this invention is to provide a method for preparing a positive electrode which has a uniform thickness and which can prevent the deterioration in the oxidation number of manganese dioxide at drying of the electrode, and this method comprises adding a dispersion of polytetrafluoroethylene, polyacrylic acid and water to a mixture of a positive electrode-active material and an electrically conductive agent, kneading these components to prepare a paste for the positive electrode, and applying the paste on one side or both sides of a supporting material.

DESCRIPTION OF THE PREFERRED EMBODIMENT

This invention is further described below with reference to accompanying drawings.

Figure 1:
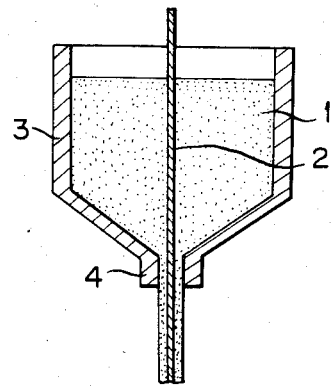
FIG. 1 is a sectional view of the main portion of an electrode-manufacturing device.

FIG. 1 is a sectional view of the main portion of an electrode-manufacturing device for applying a positive electrode paste on a supporting material, and reference numeral 1 in the drawing is a positive electrode paste which is prepared by adding an electrically conductive agent, a binder and the like to an active material such as manganese dioxide or carbon fluoride, and kneading them. Numerals 2, 3 and 4 designate a supporting material for the electrode, a hopper and a slit, respectively. The application of the positive electrode paste on the opposite sides of the supporting material is carried out by causing the electrode supporting material 2 to pass through the positive electrode paste 1 from above, and drawing the supporting material 2 through the slit 4 provided at the lower portion of the hopper 3. Afterward, the applied supporting material 2 is dried to prepare a desired electrode.

In cases where the supporting material possesses both functions of a positive electrode terminal and a current collector, the positive electrode paste is carrried only one side of the supporting material.

The positive electrode terminal obtained by applying a positive electrode paste on one side of a supporting material may preferably be used by providing a three-layer structure, in which ionomer resin pieces are disposed on the opposite sides of a polyethylene piece or an ethylene copolymer piece, between the positive electrode terminal and a negative electrode terminal.

Of the above-mentioned manganese dioxide or carbon fluoride as an active material, manganese dioxide may be preferably be used, in an amount of 40 wt. %. As an electrically conductive agent, there may be employed graphite or acetylene black, and graphite may preferably be used in an amount of 5 wt. %. As a binder, there may be used polytetrafluoroethylene (PTFE) or tetrafluoroethylenehexafluoropropylene copolymer, and polytetrafluoroethylene (PTFE) may preferably be used in an amount of 1 wt. %. Polyacrylic acid may be added in an amount of 1 wt. %. Water may be added in an amount of 53 wt. %.

By the use of the electrode-manufacturing device shown in FIG. 1, the following samples (A), (B) and (C) were manufactured:

Sample (A): An electrode of this invention in which a dispersion of polytetrafluoroethylene and polyacrylic acid were used as binders.

Sample (B): A conventional electrode in which a paste comprising a dispersion of polytetrafluoroethylene alone was used as a binder.

Sample (C): A conventional electrode in which a paste prepared by adding a semisynthetic water-soluble high polymer of methyl cellulose to polytetrafluoroethylene was employed.

Figure 2:
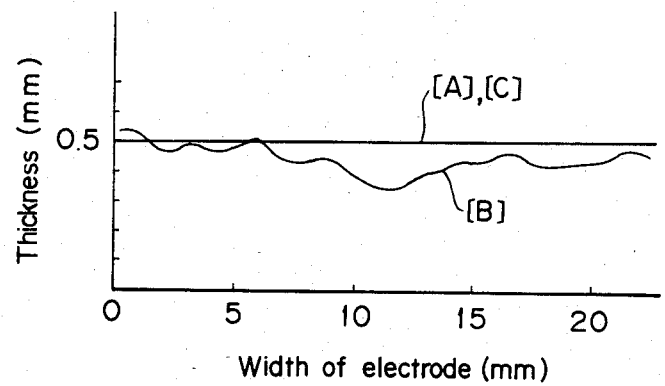
FIG. 2 is a graph showing the variation in thickness of positive electrodes manufactured by the device in FIG. 1.

For these electrodes, the variation in thickness was measured, and the results are represented by curves in FIG. 2.

As seen from FIG. 2, in the case of the sample (B) in which the dispersion of polytetrafluoroethylene was used as the binder, the scatter of thickness of electrode was wide, but in the cases of the samples (A) and (C) in which water-soluble high polymers such as polyacrylic acid and methyl cellulose were further added thereto, the thickness thereof was uniform respectively. In this connection, if the water-soluble high polymer of, for example, polyacrylic acid or methyl cellulose is in an amount of 0.1 wt. % or more, preferably in an amount of 1 wt. %, the electrode having the uniform thickness can be manufactured, though the proper content of the high polymer depends on an amount of polytetrafluoroethylene.

It should be noted that at drying of the electrode, a semisynthetic water-soluble high polymer such as methyl cellulose or carboxymethyl cellulose will react with manganese dioxide at a temperature of about 200° C. or more to chemically reduce manganese dioxide grains on the surfaces thereof. As a result, the oxidation number of manganese dioxide will be lowered, and if a cell is manufactured by the use of such an electrode, the discharge capacity of the manufactured cell will deteriorate. However, as in this invention, using polyacrylic acid of the semisynthetic water-soluble high polymer and the dispersion of polytetrafluoroethylene as the binders permits preparing the electrode plate having a uniform thickness and obtaining the positive electrode which can prevent the oxidation number of manganese dioxide from lowering at the time of drying, whereby if the positive electrode plate is used in the preparation of the cell, the deterioration in the discharge capacity can be prevented.

Figure 3:
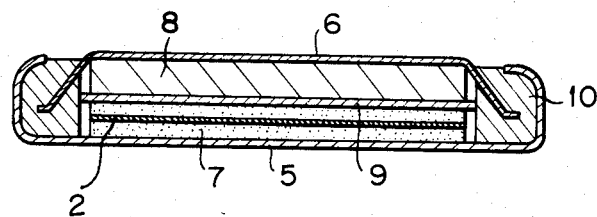
FIG. 3 is a sectional view of a coin-shaped non-aqueous electrolyte cell in one embodiment of this invention.

FIG. 3 shows a coin-shaped non-aqueous electrolyte cell manufactured by using the positive electrode which was prepared in accordance with this invention. In this drawing, reference numeral 2 is a supporting material, 5 is a positive electrode container having simultaneously the function as a positive electrode terminal, and numeral 6 is a negative electrode sealing plate having simultaneously the function as a negative electrode terminal. Numeral 2 is a supporting material, 7 is positive electrode, 8 is a negative electrode, 9 is a separator interposed between the positive and negative electrodes, and 10 is an insulating packing. In this case, the positive electrode 7 is was prepared according to the following steps: Manganese dioxide which was heated at 460° C. for 5 hours was mixed with graphite which was an electrically conductive agent. To the resulting mixture, polyacrylic acid which was a synthetic water-soluble high polymer, water and the dispersion of polytetrafluoroethylene were then added, and mixing and kneading of them were carried out to prepare a paste. By the use of the electrode-manufacturing device shown in FIG. 1, the thus prepared paste was applied on a supporting material having simultaneously the function as a current collector. Predrying was carried out at a temperature of 100° to 150° C. for 2 to 3 hours in order to remove water therefrom, and the supporting material was punched into members each having a predetermined diameter, followed by final drying at about 250° C. for 5 to 10 hours.

To confirm effects of the positive electrode prepared in accordance with the method of this invention, there was manufactured a JIS specification CR 2016 type cell having the structure shown in FIG. 3 and the size of 20 mm in external diameter and 1.6 mm in height. In this cell, the positive electrode was utilized which was prepared in the above-mentioned manner of this invention and in which polyacrylic acid was used in an amount of 1 wt. % based on the weight of the paste for the positive electrode. The used negative electrode-active material, separator and electrolyte were lithium, a polypropylene non-woven fabric and a solution of lithium perchlorate in a mixed solvent of 1,2-dimethoxyethane, respectively. For the thus manufactured cell, a constant load discharge of 30 K$\Omega$ was carried out, and a measured discharge curve is represented by (A) in FIG. 4. For comparison, FIG. 4 further shows a discharge curve of a conventional cell (B) in which no polyacrylic acid was added, and a curve of another conventional cell (C) in which methyl cellulose of the semisynthetic water-soluble high polymer was added in an amount of 1 wt. %.

Figure 4:
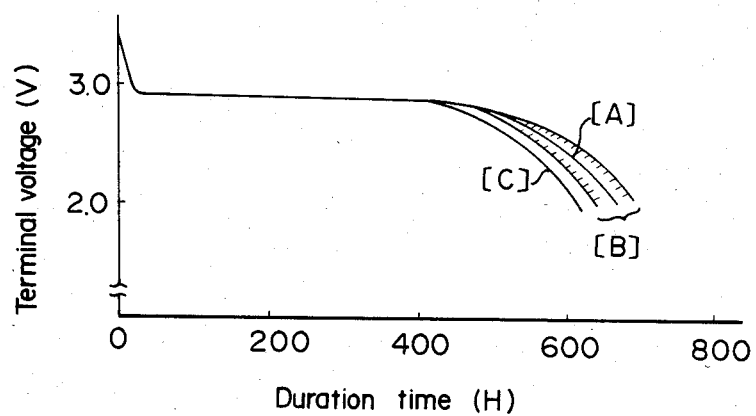
FIG. 4 shows discharge curves of the respective cells.

The results in FIG. 4 indicate that the curve of the cell (A) using the positive electrode of this invention therein in which polyacrylic acid was used has about the same discharge capacity as in the conventional cell (B) using no polyacrylic acid therein, but the curve of the cell (B) has a wide scatter and is thus poorer in quality as compared with the other cells (A) and (C). Further, in the conventional cell (C), the scatter of the discharge capacity is narrower than in the cells (A) and (B), but the cell (C) is inferior in a value of the discharge capacity to the others and thus is poor in quality. Therefore, it is apparent that in the cell (A) having the positive electrode therein which was prepared in accordance with the method of this invention, the discharge capacity is great and the discharge scatter is narrow.

Further, the oxidation numbers of manganese dioxides in the respective cells (A), (B) and (C) were inspected, and it was found that the oxidation number of the cell (C) was lower by 12% than the cells (A) and (B). Such a decrease in the oxidation number would be attributable to the reaction of methyl cellulose of the added semisynthetic water-soluble high polymer with manganese dioxide.

As understood from the foregoing, the cell in which the positive electrode plate prepared in accordance with the method of this invention is used can be concluded to have an excellent quality on the ground that the scatter is narrow and the discharge capacity is not lowered.

The electrode plate prepared in accordance with this invention contains polytetrafluoroethylene and thus is flexible. Therefore, this electrode plate may be applied to a cell for a wound electrode and flat cell, in addition to the coin-shaped cell employed in the above-mentioned example.

We claim:

1. A method for preparing a positive electrode for a non-aqueous electrolyte cell which comprises the steps of (1) applying a mixture of positive electrode-active material, an electrically conductive agent, a dispersion of polytetrafluoroethylene, polyacrylic acid and water on one side or both sides of a supporting material, and (2) then drying said supporting material at about 250° C. for 5 to 10 hours.

2. The method for preparing a positive electrode for a non-aqueous electrolyte cell according to claim 1, wherein said polyacrylic acid is used in an amount of 0.1 wt. % or more.

3. The method for preparing a positive electrode for a non-aqueous electrolyte cell according to claim 2, wherein said polyacrylic acid is used in an amount of 1 wt. %.

4. The method for preparing a positive electrode for a non-aqueous electrolyte cell according to claim 1, wherein the mixing ratio of said positive electrode-active material, an electrically conductive agent, a dispersion of polytetrafluoroethylene, polyacrylic acid and water is in an amount of 40 wt. %, 5 wt. %, 1 wt. %, 1 wt. % and 53 wt. %, respectively.

5. The method for preparing a positive electrode for a non-aqueous electrolyte cell according to claim 1, wherein said positive electrode-active material is selected from manganese dioxide and carbon fluoride.

6. The method for preparing a positive electrode for a non-aqueous electrolyte cell according to claim 5, wherein said positive electrode-active material is manganese dioxide.

7. The method for preparing a positive electrode for a non-aqueous electrolyte cell according to claim 1, wherein said electrically conductive agent is selected from graphite or acetylene black.

8. The method for preparing a positive electrode for a non-aqueous electrolyte cell according to claim 7, wherein said electrically conductive agent is graphite.

9. The method for preparing a positive electrode for a non-aqueous electrolyte cell according to claim 1, wherein step (1) comprises kneading said mixture to prepare a paste and then applying said paste to a side of said supporting material.

* * * * *